(12) United States Patent
Wang et al.

(10) Patent No.: US 10,924,702 B2
(45) Date of Patent: Feb. 16, 2021

(54) MULTI-CHANNEL IMAGE CAPTURE SYSTEM

(71) Applicant: SUZHOU AVIEW IMAGE TECHNOLOGY CO., LTD., Suzhou (CN)

(72) Inventors: Nengdong Wang, Suzhou (CN); Hongxin He, Suzhou (CN); Fang Zhao, Suzhou (CN); Liang Zhang, Suzhou (CN)

(73) Assignee: SUZHOU AVIEW IMAGE TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 16/609,250

(22) PCT Filed: Feb. 27, 2019

(86) PCT No.: PCT/CN2019/076332
§ 371 (c)(1),
(2) Date: Oct. 29, 2019

(87) PCT Pub. No.: WO2019/179292
PCT Pub. Date: Sep. 26, 2019

(65) Prior Publication Data
US 2020/0053304 A1    Feb. 13, 2020

(30) Foreign Application Priority Data

Mar. 22, 2018 (CN) ............................ 2018 1 0240847

(51) Int. Cl.
*H04N 5/378* (2011.01)
*G06T 9/00* (2006.01)

(52) U.S. Cl.
CPC ............... *H04N 5/378* (2013.01); *G06T 9/00* (2013.01)

(58) Field of Classification Search
CPC .......... G06T 9/00; H04N 5/232; H04N 5/247; H04N 5/268; H04N 5/378; H04N 5/4448; H04N 7/181
See application file for complete search history.

(56) References Cited

U.S. PATENT DOCUMENTS 8,587,661 B2 * 11/2013 McCubbrey ........... H04N 7/181
348/159
10,148,875 B1 * 12/2018 Chen .................. H04N 21/2343
(Continued)

FOREIGN PATENT DOCUMENTS

| CN | 102541778 A | 7/2012 |
| CN | 108712626 A | 10/2018 |
| WO | 2007043266 A1 | 4/2007 |

*Primary Examiner* — Amy R Hsu
(74) *Attorney, Agent, or Firm* — SZDC Law PC

(57) ABSTRACT

The invention discloses a multi-channel image capture system including a secondary image information transmission channel, a secondary FPGA chip and a signal conversion chip. The secondary image information transmission channel has a camera interface unit, a primary FPGA chip and a cache unit. The camera interface unit includes several camera interfaces and is connected to an external camera. The primary FPGA chip receives, decodes, and then writes the image data captured by the camera to the cache unit, and reads the image data from the cache unit according to a read command from the secondary FPGA chip and transmits it to the secondary FPGA chip. The secondary FPGA chip acquires the image data from the cache unit based on the priority and the capturing order and transmits it to the signal conversion chip. The signal conversion chip is connected to the terminal and transmits the image data to the terminal.

8 Claims, 2 Drawing Sheets

(56) References Cited

U.S. PATENT DOCUMENTS

| | | | |
|---|---|---|---|
| 2005/0140787 A1* | 6/2005 | Kaplinsky | G08B 13/19691 348/207.1 |
| 2007/0035632 A1* | 2/2007 | Silvernail | H04N 5/23206 348/211.3 |
| 2010/0111489 A1* | 5/2010 | Presler | H04N 5/3765 386/278 |
| 2015/0358560 A1* | 12/2015 | Boulanger | H04N 5/3658 348/164 |
| 2016/0127615 A1 | 5/2016 | Ikeuchi | |
| 2019/0104269 A1* | 4/2019 | Grossmann | H01L 27/14634 |
| 2019/0174111 A1* | 6/2019 | Munro | G01S 17/89 |
| 2019/0238829 A1* | 8/2019 | Reinhard | B42D 25/36 |

* cited by examiner

MULTI-CHANNEL IMAGE CAPTURE SYSTEM

This application is the National Stage Application of PCT/CN2019/076332, filed on Feb. 27, 2019, which claims priority to Chinese Patent Application No.: 201810240847.5, filed on Mar. 22, 2018, which is incorporated by reference for all purposes as if fully set forth herein.

FIELD OF THE INVENTION

The present invention relates to the field of image capture techniques, and more particularly to a multi-channel image capture system.

DESCRIPTION OF THE RELATED ART

Cameras are used in increasingly more fields with advancement in techniques such as smartphones and surveillance cameras, and high-definition cameras have come to be the main trend. However, in many fields, a single camera cannot meet the requirements, and it has become a trend to process signals from multiple cameras simultaneously in one system.

When it is necessary for a user to observe multiple cameras at the same time, for example, in a current video surveillance system, two methods are generally used. One method includes connecting the multiple cameras to multiple terminals respectively for display. As such, the number of the terminals depends on the number of the cameras, which causes the problem of a high economic cost. Another method includes connecting the multiple cameras to one terminal through multiple channels for being processed and then displayed, which causes the problem of a large amount of resources of the terminal being occupied, thereby causing heavy processing load on the terminal and consequently reducing the processing efficiency of the terminal.

SUMMARY OF THE INVENTION

In order to overcome the disadvantages of the prior art, one object of the present invention is to provide a multi-channel image capture system arranged between a camera and a terminal that can control multiple cameras simultaneously.

For the above purpose, the invention provides a multi-channel image capture system including a plurality of secondary image information transmission channels, a secondary FPGA chip, and a signal conversion chip. The several secondary image information transmission channels are all connected to the secondary FPGA chip. The secondary image information transmission channels each have a camera interface unit, a primary FPGA chip, and a cache unit. The camera interface unit is connected to the primary FPGA chip, the primary FPGA chips are all connected to the secondary FPGA chip, the secondary FPGA chip is connected to the signal conversion chip, and the cache unit is connected to the primary FPGA chip.

The camera interface unit is configured to be connected to an external camera and includes several camera interfaces.

The primary FPGA chip is configured to receive, decode, and then write image data captured by the camera to the cache unit and is further configured to read the image data from the cache unit according to a read command from the secondary FPGA chip and transmit it to the secondary FPGA chip.

The cache unit is configured to cache the image data.

The secondary FPGA chip is configured to acquire the image data from the cache unit based on a priority and a capturing order and transmit it to the signal conversion chip.

The signal conversion chip is configured to be connected to the terminal to transmit the image data to the terminal.

In a preferable embodiment of the present invention, the primary FPGA chip has a read-write unit and a primary image transmission channel. The primary image transmission channel has a decode unit, a data processing unit, and a buffer unit. The image data captured by the camera is sequentially decoded by the decode unit, processed by the data processing unit, buffered by the buffer unit, and then written to the cache unit by the read-write unit. The read-write unit reads the image data from the cache unit according to the read command from the secondary FPGA chip and transmits it to the secondary FPGA chip.

In a preferable embodiment of the present invention, the primary FPGA chip has multiple primary image transmission channels. The primary FPGA chip further has a primary channel switching control unit. The multiple primary image transmission channels are all connected to the primary channel switching control unit. The primary channel switching control unit is configured to control switching of the multiple primary image transmission channels.

In a preferable embodiment of the present invention, there are a plurality of secondary image information transmission channels. The secondary FPGA chip has a secondary channel switching control unit. The secondary channel switching control unit is configured to control switching of the multiple secondary image information transmission channels.

In a preferable embodiment of the present invention, the secondary FPGA chip has a terminal data reception unit, a control information processing unit, and a camera information distribution unit. The terminal data reception unit is connected to the signal conversion chip, the control information processing unit and the camera information distribution unit are both connected to the terminal data reception unit, the camera information distribution unit is further configured to be connected to the external camera, and the primary FPGA chip is connected to the control signal processing unit.

The terminal data reception unit is configured to receive the camera information and control information transmitted by the terminal and send the camera information to the camera information distribution unit and send the control information to the control information processing unit.

The camera information distribution unit is configured to receive the camera information and send the camera information to the external camera.

The control information processing unit is configured to receive the control information and send the control information to the data channel control unit and the primary FPGA chip.

In a preferable embodiment of the present invention, the number of the primary FPGA chips is four, the number of the primary image transmission channels is six, the number of the camera interface units is four, and the number of the camera interfaces in the camera interface unit is six.

In a preferable embodiment of the present invention, the signal conversion chip is a USB conversion chip.

In a preferable embodiment of the present invention, the multi-channel image capture system is integrated into a board card.

As compared with the prior art, the invention has the following advantages:

The multi-channel image capture system of the present invention includes secondary image information transmission channels, a secondary FPGA chip and a signal conversion chip. The secondary image information transmission channel has a camera interface unit, a primary FPGA chip, and a cache unit. The camera interface unit includes several camera interfaces and is configured to be connected to an external camera. The primary FPGA chip is configured to receive, decode, and then write the image data captured by the camera to the cache unit, and is further configured to read the image data from the cache unit according to a read command from the secondary FPGA chip and transmit it to the secondary FPGA chip. The secondary FPGA chip is configured to acquire the image data from the cache unit based on the priority and the capturing order and transmit it to the signal conversion chip. The signal conversion chip is configured to be connected to the terminal and transmit the image data to the terminal. With the multi-channel image capture system of the present invention, multiple cameras can be connected to one terminal through multiple channels, and decoding and image data processing are completed within the system, thereby reducing processing load on the cameras and the terminal and increasing the efficiency of image capturing. Moreover, the number of cameras connectable to one single terminal is no longer limited by the configuration of the terminal. Therefore, such a multi-channel image capture system has an extensive market and application prospect.

These and other objects and advantages of the present invention will become readily apparent to those skilled in the art upon reading the following detailed description by referring to the accompanying drawings.

DETAILED DESCRIPTION OF THE PREFERRED EMBODIMENTS

The invention will be further illustrated in more detail with reference to the accompanying drawings and embodiments. It is noted that, the following embodiments only are intended for purposes of illustration, but are not intended to limit the scope of the present invention.

Figure 1:
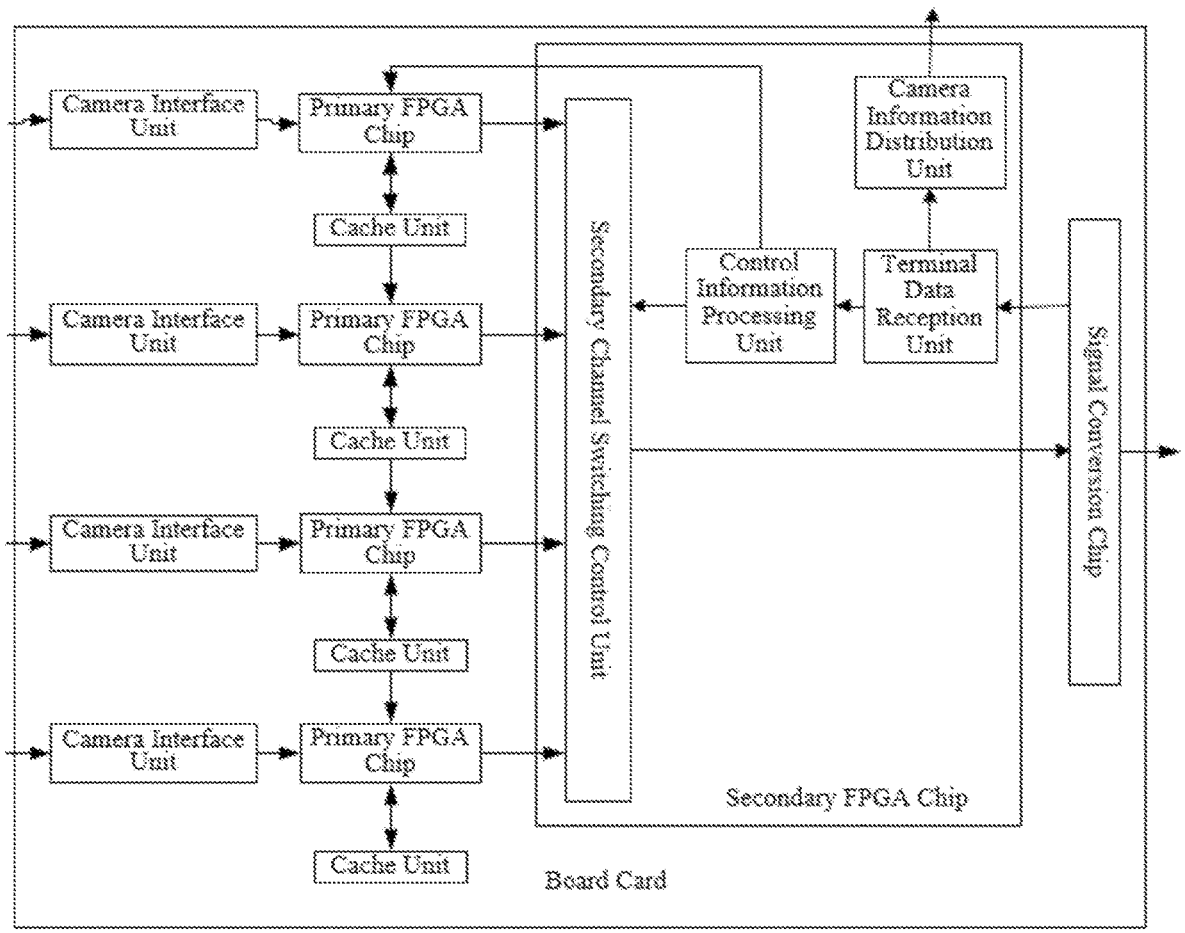
FIG. 1 is a schematic view showing a multi-channel image capture system according to an embodiment of the present invention.
Figure 2:
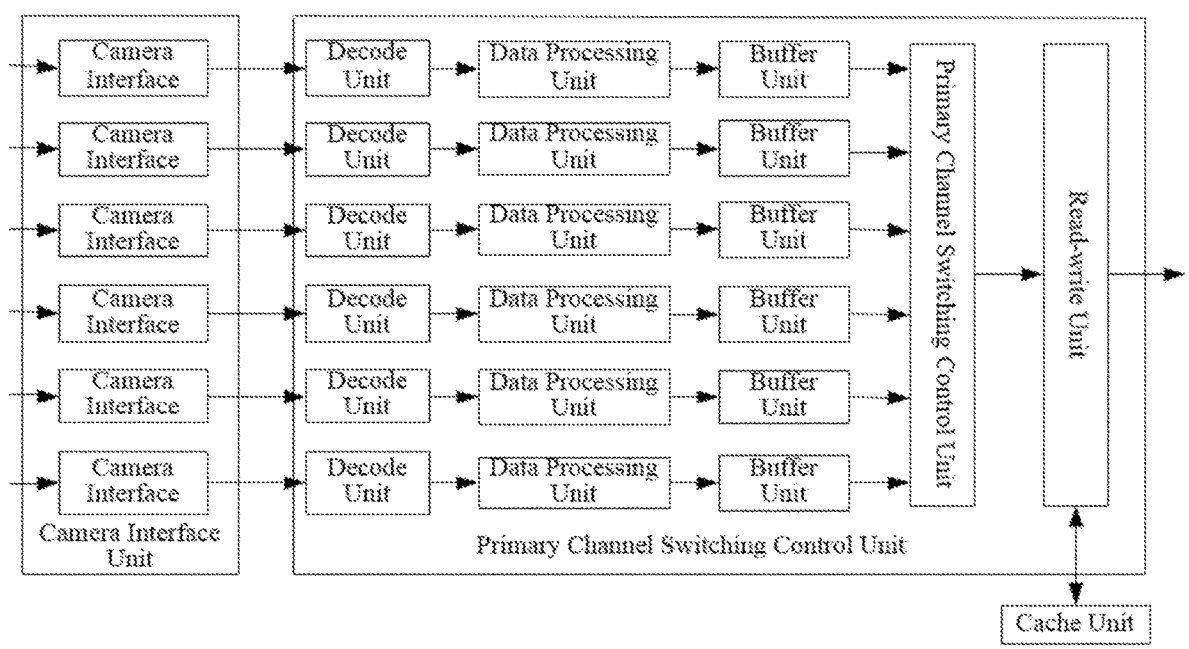
FIG. 2 is a schematic view showing the internal structure of a multi-channel image capture system according to an embodiment of the present invention.

As shown in FIGS. 1 and 2, a multi-channel image capture system according to an embodiment of the present invention includes several secondary image information transmission channels, a secondary FPGA chip, and a signal conversion chip. The several secondary image information transmission channels are all connected to the secondary FPGA chip. There are multiple secondary image information transmission channels. The secondary FPGA chip has a secondary channel switching control unit configured to control switching of the multiple secondary image information transmission channels. The secondary image information transmission channels each have a camera interface unit, a primary FPGA chip, and a cache unit. The camera interface unit is connected to the primary FPGA chip, the primary FPGA chips are all connected to the secondary FPGA chip, the secondary FPGA chip is connected to the signal conversion chip, and the cache unit is connected to the primary FPGA chip. The camera interface unit is configured to be connected to external cameras. The camera interface unit includes several camera interfaces. The primary FPGA chip is configured to receive, decode, and then write the image data captured by the camera to the cache unit, and is further configured to read the image data from the cache unit according to a read command from the secondary FPGA chip and transmit it to the secondary FPGA chip. The cache unit is configured to cache the image data. The secondary FPGA chip is configured to acquire the image data from the cache unit based on the priority and the capturing order and transmit it to the signal conversion chip. The signal conversion chip is configured to be connected to a terminal and transmit the image data to the terminal.

The primary FPGA chip has a read-write unit and a primary image transmission channel. The primary image transmission channel has a decode unit, a data processing unit, and a buffer unit. The image data captured by the camera is sequentially decoded by the decode unit, processed by the data processing unit, buffered by the buffer unit, and then written to the cache unit by read-write unit. The read-write unit reads the image data from the cache unit according to the read command from the secondary FPGA chip and transmits it to the secondary FPGA chip.

Preferably, the primary FPGA chip has multiple primary image transmission channels. The primary FPGA chip further has a primary channel switching control unit. The multiple primary image transmission channels are all connected to the primary channel switching control unit. The primary channel switching control unit is configured to control switching of the multiple primary image transmission channels.

The secondary FPGA chip has a terminal data reception unit, a control information processing unit, and a camera information distribution unit. The terminal data reception unit is connected to the signal conversion chip, the control information processing unit and the camera information distribution unit are both connected to the terminal data reception unit, the camera information distribution unit is further configured to be connected to external cameras, and the primary FPGA chip is connected to the control signal processing unit. The terminal data reception unit is configured to receive the camera information and control information transmitted by the terminal, and send the camera information to the camera information distribution unit and send the control information to the control information processing unit. The camera information distribution unit is configured to receive the camera information and send the camera information to the external cameras. The control information processing unit is configured to receive the control information and send the control information to the data channel control unit and the primary FPGA chip.

In this embodiment, the number of the primary FPGA chips is four, the number of the primary image transmission channels is six, the number of the camera interface units is four, and the number of the camera interfaces in the camera interface unit is six. In another embodiment of the present invention, the number of the primary FPGA chips, the primary image transmission channels, and the secondary image transmission channels may be set as desired.

In this embodiment, the signal conversion chip is a USB conversion chip. In another embodiment of the present invention, the signal conversion chip may be another chip, provided it provides signal conversion.

Preferably, the multi-channel image capture system of the present invention is integrated into a board card.

Beneficial Effects of the Invention

The multi-channel image capture system of the present invention includes a secondary image information transmission channel, a secondary FPGA chip, and a signal conversion chip. The secondary image information transmission channel has a camera interface unit, a primary FPGA chip, and a cache unit. The camera interface unit includes several camera interfaces and is configured to be connected to an external camera. The primary FPGA chip is configured to receive, decode, and then write the image data captured by the camera to the cache unit, and is further configured to read the image data from the cache unit according to the read command from the secondary FPGA chip and transmit it to the secondary FPGA chip. The secondary FPGA chip is configured to acquire the image data from the cache unit based on the priority and the capturing order and transmit it to the signal conversion chip. The signal conversion chip is configured to be connected to the terminal and transmit the image data to the terminal. With the multi-channel image capture system of the present invention, multiple cameras can be connected to one terminal through multiple channels, and decoding and image data processing are completed within the system, thereby reducing processing load on the camera and the terminal and increasing the efficiency of image capturing. The number of cameras connectable to one single terminal is no longer limited by the configuration of the terminal. Therefore, such a multi-channel image capture system has an extensive market and application prospect.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A multi-channel image capture system, comprising:
   a signal conversion chip;
   a secondary FPGA chip which is connected to the signal conversion chip; and
   a plurality of secondary image information transmission channels which are all connected to the secondary FPGA chip, and the secondary image information transmission channels each having a primary FPGA chip, a camera interface unit connected to the primary FPGA chip, and a cache unit connected to the primary FPGA chip, wherein the primary FPGA chips are all connected to the secondary FPGA chip,
   wherein
   the camera interface unit is configured to be connected to an external camera and includes several camera interfaces;
   the primary FPGA chip is configured to receive, decode, and then write image data captured by the camera to the cache unit and is further configured to read the image data from the cache unit according to a read command from the secondary FPGA chip and transmit it to the secondary FPGA chip;
   the cache unit is configured to cache the image data;
   the secondary FPGA chip is configured to acquire the image data from the cache unit based on a priority and a capturing order and transmit it to the signal conversion chip; and
   the signal conversion chip is configured to be connected to a terminal to transmit the image data to the terminal.

2. The multi-channel image capture system as claimed in claim 1, wherein the primary FPGA chip has a read-write unit and a primary image transmission channel, the primary image transmission channel has a decode unit, a data processing unit and a buffer unit, wherein the image data captured by the camera is sequentially decoded by the decode unit, processed by the data processing unit, buffered by the buffer unit, and then written to the cache unit by the read-write unit, and the read-write unit reads the image data from the cache unit according to the read command from the secondary FPGA chip and transmits it to the secondary FPGA chip.

3. The multi-channel image capture system as claimed in claim 2, wherein the primary FPGA chip has multiple primary image transmission channels, the primary FPGA chip further has a primary channel switching control unit, the multiple primary image transmission channels are all connected to the primary channel switching control unit, and the primary channel switching control unit is configured to control switching of the multiple primary image transmission channels.

4. The multi-channel image capture system as claimed in claim 1, wherein there are a plurality of secondary image information transmission channels, the secondary FPGA chip has a secondary channel switching control unit, and the secondary channel switching control unit is configured to control switching of the multiple secondary image information transmission channels.

5. The multi-channel image capture system as claimed in claim 1, wherein the secondary FPGA chip has a terminal data reception unit, a control information processing unit, and a camera information distribution unit, wherein the terminal data reception unit is connected to the signal conversion chip, the control information processing unit and the camera information distribution unit are both connected to the terminal data reception unit, the camera information distribution unit is further configured to be connected to the external camera, and the primary FPGA chip is connected to the control signal processing unit;
   the terminal data reception unit is configured to receive the camera information and control information transmitted by the terminal, and send the camera information to the camera information distribution unit and send the control information to the control information processing unit;
   the camera information distribution unit is configured to receive the camera information and send the camera information to the external camera; and
   the control information processing unit is configured to receive the control information and send the control information to the data channel control unit and the primary FPGA chip.

6. The multi-channel image capture system as claimed in claim 1, wherein the number of the primary FPGA chips is four, the number of the primary image transmission channels is six, the number of the camera interface units is four, and the number of the camera interfaces in the camera interface unit is six.

7. The multi-channel image capture system as claimed in claim 1, wherein the signal conversion chip is a USB conversion chip.

8. The multi-channel image capture system as claimed in any claim 1, wherein the multi-channel image capture system is integrated into a board card.

* * * * *